US010762455B1

(12) United States Patent
Sager et al.

(10) Patent No.: US 10,762,455 B1
(45) Date of Patent: Sep. 1, 2020

(54) SYSTEM AND METHOD OF SCHEDULE OPTIMIZATION FOR LONG-RANGE STAFF PLANNING

(71) Applicant: JDA Software Group, Inc., Scottsdale, AZ (US)

(72) Inventors: Jon Edward Sager, Westminster, CO (US); Dan Morris, Cleveland, GA (US); Alun Jones, Scottsdale, AZ (US)

(73) Assignee: Blue Yonder Group, Inc., Scottsdale, AZ (US)

( * ) Notice: Subject to any disclaimer, the term of this patent is extended or adjusted under 35 U.S.C. 154(b) by 223 days.

(21) Appl. No.: 15/823,298

(22) Filed: Nov. 27, 2017

Related U.S. Application Data

(60) Provisional application No. 62/427,025, filed on Nov. 28, 2016.

(51) Int. Cl.
*G06Q 10/06* (2012.01)
*G06Q 10/10* (2012.01)

(52) U.S. Cl.
CPC ... *G06Q 10/063116* (2013.01); *G06Q 10/067* (2013.01); *G06Q 10/1053* (2013.01); *G06Q 10/06315* (2013.01)

(58) Field of Classification Search
CPC .......................................... G06Q 10/00–50/00
USPC ............................................... 705/7.11–7.42
See application file for complete search history.

(56) References Cited

U.S. PATENT DOCUMENTS

| | | | | |
|---|---|---|---|---|
| 5,890,134 A * | 3/1999 | Fox | ........................ | G06Q 10/06 705/7.24 |
| 6,385,620 B1 * | 5/2002 | Kurzius | ................. | G06Q 10/10 |
| 6,587,831 B1 * | 7/2003 | O'Brien | ......... | G06Q 10/063116 705/7.16 |
| 6,985,872 B2 * | 1/2006 | Benbassat | .............. | G06Q 10/06 705/7.14 |
| 7,480,913 B2 * | 1/2009 | Buco | ...................... | G06Q 10/06 718/105 |
| 7,885,846 B2 * | 2/2011 | An | ......................... | G06Q 10/04 |
| 8,311,863 B1 * | 11/2012 | Kemp | ................ | G06Q 10/0639 705/7.11 |
| 8,402,070 B2 * | 3/2013 | Szlam | .................... | G06Q 10/10 707/610 |
| 9,087,310 B2 * | 7/2015 | Bournas | ......... | G06Q 10/063116 |
| 2002/0055870 A1 * | 5/2002 | Thomas | ......... | G06Q 10/063112 705/7.14 |

(Continued)

*Primary Examiner* — Alan S Miller
(74) *Attorney, Agent, or Firm* — Spencer Fane LLP; Steven J. Laureanti

(57) ABSTRACT

A system and method are disclosed for determining long-range staff planning. Embodiments include determining a baseline measurement of labor needs over a time period of one or more employees at one or more entities and modifying the baseline measurement of the labor needs over the time period based on one or more constraints that allow the one or more employees to work additional types of labor needs at the one or more entities. Embodiments further include determining working times and job assignments of the one or more employees based on one or more simulated employees that represent potential employees to the modified baseline measurement of the labor needs over the time period and storing the determined working times and job assignments in the database for the one or more employees at the one or more entities.

17 Claims, 7 Drawing Sheets

(56) References Cited

U.S. PATENT DOCUMENTS

| | | | |
|---|---|---|---|
| 2002/0143599 A1* | 10/2002 | Nourbakhsh | G06Q 10/0637 705/7.31 |
| 2003/0033184 A1* | 2/2003 | Benbassat | G06Q 30/0202 705/7.14 |
| 2005/0004828 A1* | 1/2005 | deSilva | G06Q 10/063112 705/7.16 |
| 2005/0135601 A1* | 6/2005 | Whitman, Jr. | H04M 3/523 379/266.08 |
| 2006/0229896 A1* | 10/2006 | Rosen | G06Q 10/1053 705/321 |
| 2006/0277090 A1* | 12/2006 | Bollenbeck | G06Q 10/06 705/7.14 |
| 2011/0202382 A1* | 8/2011 | Santos | G06Q 10/06 705/7.17 |
| 2012/0253879 A1* | 10/2012 | Santos | G06Q 10/06 705/7.22 |
| 2016/0088153 A1* | 3/2016 | Wicaksono | H04M 3/523 379/265.06 |

* cited by examiner

FIG. 8

SYSTEM AND METHOD OF SCHEDULE OPTIMIZATION FOR LONG-RANGE STAFF PLANNING

CROSS-REFERENCE TO RELATED APPLICATIONS

The present disclosure is related to that disclosed in the U.S. Provisional Application No. 62/427,025, filed Nov. 28, 2016, entitled "System and Method of Schedule Optimization for Long-range Staff Planning." U.S. Provisional Application No. 62/427,025 is assigned to the assignee of the present application. The subject matter disclosed in U.S. Provisional Application No. 62/427,025 is hereby incorporated by reference into the present disclosure as if fully set forth herein. The present invention hereby claims priority under 35 U.S.C. § 119(e) to U.S. Provisional Application No. 62/427,025.

TECHNICAL FIELD

The present disclosure relates generally to retail workforce management and specifically to a system and method of long-range staff planning.

BACKGROUND

Business workforce management requires, among other things, the scheduling of employees and other staff to meet the expected business demands over a future planning period. Typically, businesses schedule a workforce over the next week or two, based on expected business demand, inventory supply, and other factors that may predict the number of positions needed to meet the business's needs. However, current workforce management planning and scheduling are not able to plan for long-range periods accurately. The inability to plan for long-range staffing needs is undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

FIG. 8 illustrates an individual employee interface of the staff planner, according to an embodiment.

DETAILED DESCRIPTION

Figure 1:
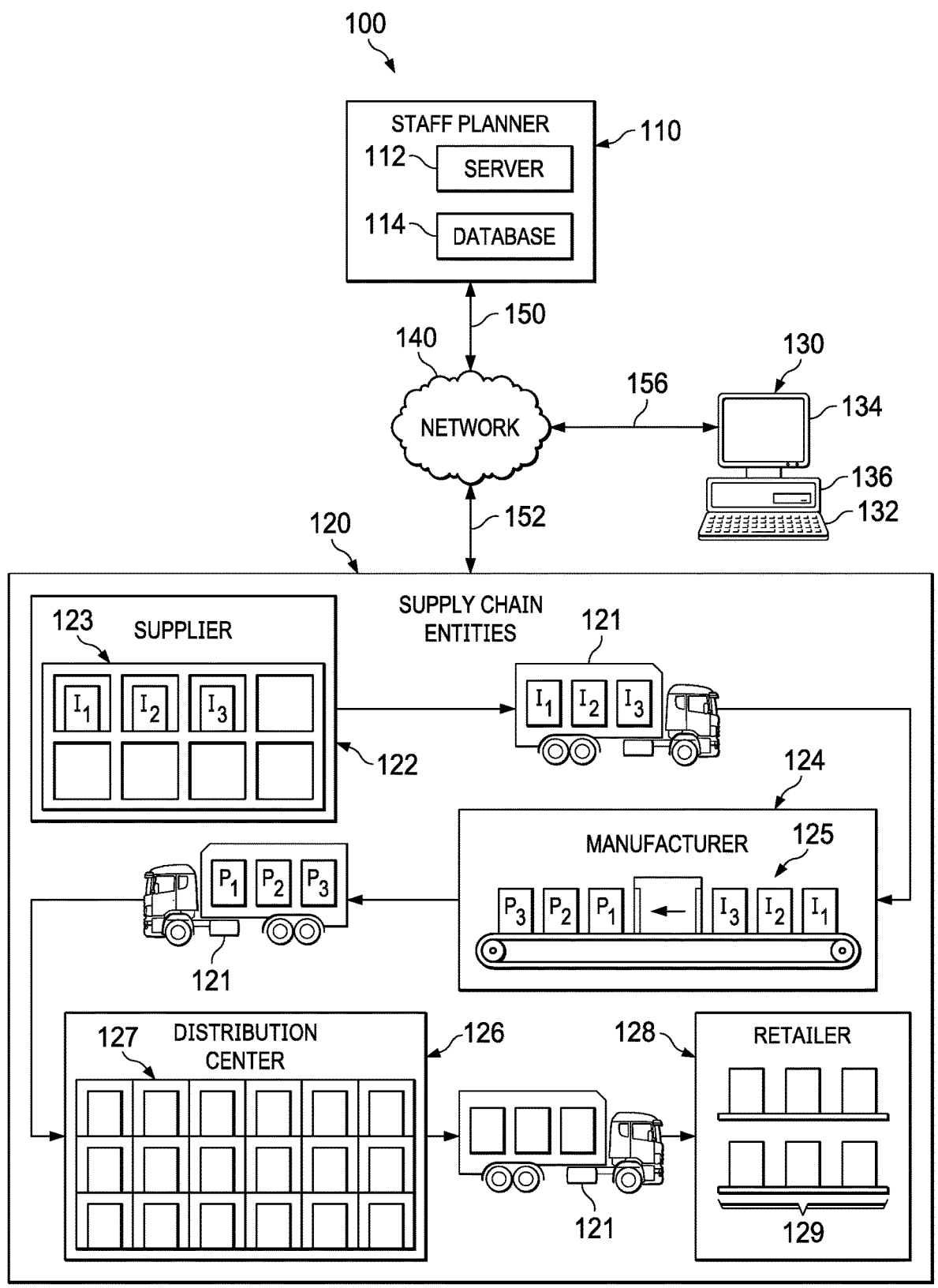
FIG. 1 illustrates an exemplary supply chain network according to a first embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

As described more fully below, aspects of the following disclosure relate to schedule planning for employees and other staff. According to a first aspect, a staff planner calculates the timing and jobs needed to meet future labor demand over long-range periods. According to this aspect, the staff planner may determine a long-range staff plan over a six-month to fifteen-month period by adopting a course level of resolution for the time buckets representing each job shift and representing a particular employee's shift during the time buckets with a fractional unit. According to a second aspect, the staff planner identifies whether hiring more employees or cross-training existing employees is more cost effective to cover the calculated future labor demand. According to this aspect, the staff planner may determine suggestions to resolve future labor demands by executing a long-range staff planning model twice. A first execution uses only existing employees and establishes a base line measurement of labor demand for the future time period. The staff planner then modifies the long-range staff planning model to allow existing employees to work additional jobs and, then, assesses the value of the employees working any additional jobs. In addition, or as an alternative, the staff planner modifies the long-range staff planning model by adding simulated employees to represent potential new hires. These simulated employees represent potential hires with a variety of availability and jobs based on the results of the first model execution. The long-range staff planning model is then executed a second time, this time allowing existing employees to receive different job assignments and incorporating simulated employees. The results are then analyzed to suggest cross training and hiring recommendations to meet future labor demand at a lower cost.

FIG. 1 illustrates an exemplary supply chain network 100 according to a first embodiment. Supply chain network 100 comprises staff planner 110, one or more supply chain entities 120, computer 130, network 140, and communication links 150-156. Although a single staff planner 110, one or more supply chain entities 120, a single computer 130, and a single network 140, are shown and described, embodiments contemplate any number of staff planners, supply chain entities, computers, or networks, according to particular needs. In one embodiment, staff planner 110 comprises server 112 and database 114. As explained in more detail below, staff planner 110 comprises one or more engines to, for example, create staff planning problems and plans, hiring and cross training suggestions, and MIP and scheduling models. These one or more engines may also, according to embodiments, generate a graphical user interface (GUI) to display and configure scheduling models, staff planning problems and plans, hiring and cross training suggestions, labor forecasts, and the like. Each of these modules will be discussed in more detail below.

As shown in FIG. 1, supply chain network 100 comprising staff planner 110 and one or more supply chain entities 120 may operate on one or more computers 130 that are integral to or separate from the hardware and/or software that support staff planner 110 and one or more supply chain entities 120. Computers 130 may include any suitable input device 132, such as a keypad, mouse, touch screen, microphone, or other device to input information. Output device 134 may convey information associated with the operation of supply chain network 100, including digital or analog data, visual information, or audio information. Computer 130 may include fixed or removable computer-readable storage media, including a non-transitory computer readable medium, magnetic computer disks, flash drives, CD-ROM, in-memory device or other suitable media to receive output from and provide input to supply chain network 100.

Computer 130 may include one or more processors 136 and associated memory to execute instructions and manipulate information according to the operation of supply chain network 100 and any of the methods described herein. One or more processors 136 may execute an operating system program stored in memory to control the overall operation of computer 130. For example, one or more processors 136 control the reception and transmission of signals within the system. One or more processors 136 execute other processes and programs resident in memory, such as, for example, registration, identification or communication and moves data into or out of the memory, as required by an executing process. In addition, or as an alternative, embodiments contemplate executing the instructions on computer 130 that cause computer 130 to perform functions of the method. Further examples may also include articles of manufacture including tangible computer-readable media that have computer-readable instructions encoded thereon, and the instructions may comprise instructions to perform functions of the methods described herein.

In addition, and as discussed herein, supply chain network 100 may comprise a cloud-based computing system having processing and storage devices at one or more locations, local to, or remote from staff planner 110 and one or more supply chain entities 120. In addition, each of the one or more computers 130 may be a work station, personal computer (PC), network computer, notebook computer, tablet, personal digital assistant (PDA), cell phone, telephone, smartphone, wireless data port, augmented or virtual reality headset, or any other suitable computing device. In an embodiment, one or more users may be associated with the staff planer 110 and one or more supply chain entities 120. These one or more users may include, for example, a "manager" or a "planner" handling staff planning items, and/or one or more related tasks within supply chain network 100. In addition, or as an alternative, these one or more users within supply chain network 100 may include, for example, one or more computers programmed to autonomously handle, among other things, evaluation of various levels of workforce planning, automatic scheduling of employees, task management, communication of work or role assignments, suggestions identification and management, and adjusting various levels of manufacturing and inventory levels at various stocking points and distribution centers, and/or one or more related tasks within supply chain network 100.

In accordance with the principles of embodiments described herein, staff planner 110 and/or one or more supply chain entities 120 may generate long-range staff plans, short-term schedules, labor forecasts, and the like and communicate the results to computer 130. For example, computer 130 may comprise a mobile communication device, such as a smartphone, and, staff planner 110 may communicate short-term schedules to mobile communication devices associated with employees who are scheduled to work on the short-term schedule and may wait to publish the short-term schedule until staff planner 110 receives a confirmation from the mobile communication devices that the employee is available at the times indicated on the schedule.

According to further embodiments, computer 130 may comprise a time clock or employee monitoring device, such as, for example, a computer 130 that automatically detects whether an employee is present at a workstation. According to these embodiments, staff planner 110 may automatically update long-range staff plans, short-term schedules, labor forecasts, and the like, based, at least in part, monitored or detected employee work times received from a time clock or employee monitoring device.

Further, as discussed in more detail below, staff planner 110 determines cross-training and hiring suggestions for long-range staff plans. According to embodiments, after calculating a cross-training suggestion, staff planner 110 may automatically communicate a query to a computer 130 associated with one or more employees identified in the cross-training suggestion, the query comprising a request for that employee to retrain for the job and/or role identified in the cross-training suggestion. According to embodiments, staff planner 110 may automatically update the long-range staff plan based on receiving a confirmation from computer 130 that the employee will retrain for the job and/or role indicated in the query sent to computer 130. Additionally, or in the alternative, after calculating a hiring suggestion, staff planner 110 may automatically post a hiring request for the positon indicated in the hiring suggestion to computer 130, the computer 130 hosting a job board, job hiring website, or the like.

One or more supply chain entities 120 represent one or more supply chain networks, including one or more enterprise networks, such as, for example networks of one or more suppliers 122, manufacturers 124, distribution centers 126, retailers 128 (including, for example, brick and mortar and online stores), customers, and/or the like.

According to embodiments, a transportation network directs one or more transportation vehicles 121 to ship one or more items between one or more supply chain entities 120, based, at least in part, on labor forecasts or staffing plans determined by staff planner 110. Transportation vehicles 121 comprise, for example, any number of trucks, cars, vans, boats, airplanes, unmanned aerial vehicles (UAVs), cranes, robotic machinery, or the like. Transportation vehicles 121 may comprise radio, satellite, or other communication that communicates location information (such as, for example, geographic coordinates, distance from a location, global positioning satellite (GPS) information, or the like) with staff planner 110, and/or one or more supply chain entities 120 to identify the location of the transportation vehicle 121 and the location of any inventory or shipment located on the transportation vehicle 121. In addition to the supply chain models, the number of items shipped by transportation vehicles 121 in transportation network may also be based, at least in part, on the number of items currently in stock at one or more supply chain entities 120, the number of items currently in transit in the transportation network, a forecasted demand, a supply chain disruption, and the like.

Suppliers 122 may be any suitable entity that offers to sell or otherwise provides one or more items (such as, for example, materials, components, or products) to one or more manufacturers 124. Suppliers 122 may comprise automated distribution systems 123 that automatically transport products to one or more manufacturers 124 based, at least in part, on labor forecasts or staffing plans determined by staff planner 110 and/or one or more other factors described herein.

Manufacturers 124 may be any suitable entity that manufactures at least one product. Manufacturers 124 may use one or more items during the manufacturing process to produce any manufactured, fabricated, assembled, or otherwise processed item, material, component, good, or product. In one embodiment, a product represents an item ready to be supplied to, for example, one or more supply chain entities 120 in supply chain network 100, such as retailers 128, an item that needs further processing, or any other item. Manufacturers 124 may, for example, produce and sell a product to suppliers 122, other manufacturers 124, distribution centers 126, retailers 128, a customer, or any other suitable person or entity. Manufacturers 124 may comprise automated robotic production machinery 125 that produce products based, at least in part, on labor forecasts or staffing plans determined by staff planner 110 and/or one or more other factors described herein.

Distribution centers 126 may be any suitable entity that offers to store or otherwise distribute at least one product to one or more retailers 128 and/or customers. Distribution centers 126 may, for example, receive a product from a first one or more supply chain entities 120 in supply chain network 100 and store and transport the product for a second one or more supply chain entities 120. Distribution centers 126 may comprise automated warehousing systems 127 that automatically remove products from and place products into inventory based, at least in part, on labor forecasts or staffing plans determined by staff planner 110 and/or one or more other factors described herein.

Retailers 128 may be any suitable entity that obtains one or more products to sell to one or more customers. Retailers 128 may (like the other one or more supply chain entities 120), comprise a corporate structure having a retail headquarters and one or more retail stores. Retail headquarters comprise a central planning office with oversight of one or more retail stores. Retail stores may comprise any online or brick-and-mortar store, including stores with shelving systems 129. Shelving systems 129 may include shelving and retail displays such as, for example, automated robotic shelving systems that places products on shelves or automated shelving that automatically adjusts based, at least in part, on labor forecasts or staffing plans and/or one or more other factors described herein. Shelving systems 129 may comprise, for example, various racks, fixtures, brackets, notches, grooves, slots, or other attachment devices for fixing shelves in various configurations.

Although one or more supply chain entities 120 are shown and described as separate and distinct entities, the same entity may simultaneously act as more than one of the one or more supply chain entities 120. For example, one or more supply chain entities 120 acting as a manufacturer 124 can produce a product, and the same one or more supply chain entities 120 can act as a supplier 122 to supply an item to itself or another one or more supply chain entities 120. Although one example of a supply chain network 100 is shown and described, embodiments contemplate any configuration of supply chain network 100, without departing from the scope described herein.

In one embodiment, staff planner 110 may be coupled with network 140 using communications link 150, which may be any wireline, wireless, or other link suitable to support data communications between staff planner 110 and network 140 during operation of supply chain network 100. One or more supply chain entities 120 may be coupled with network 140 using communications link 152, which may be any wireline, wireless, or other link suitable to support data communications between one or more supply chain entities 120 and network 140 during operation of supply chain network 100. Computer 130 may be coupled with network 140 using communications link 156, which may be any wireline, wireless, or other link suitable to support data communications between computer 130 and network 140 during operation of supply chain network 100. Although communication links 150-156 are shown as generally coupling one or staff planner 110, one or more supply chain entities 120, and computer 130 to network 140, any of staff planner 110, one or more supply chain entities 120, and computer 130 may communicate directly with each other, according to particular needs.

In another embodiment, network 140 includes the Internet and any appropriate local area networks (LANs), metropolitan area networks (MANs), or wide area networks (WANs) coupling staff planner 110, one or more supply chain entities 120, and computer 130. For example, data may be maintained locally to, or externally of staff planner 110, one or more supply chain entities 120, and computer 130 and made available to one or more associated users of staff planner 110, one or more supply chain entities 120, and computer 130 using network 140 or in any other appropriate manner. For example, data may be maintained in a cloud database at one or more locations external to staff planner 110, one or more supply chain entities 120, and computer 130 and made available to one or more associated users of staff planner 110, one or more supply chain entities 120, and computer 130 using the cloud or in any other appropriate manner. Those skilled in the art will recognize that the complete structure and operation of network 140 and other components within supply chain network 100 are not depicted or described. Embodiments may be employed in conjunction with known communications networks and other components.

In accordance with the principles of embodiments described herein, staff planner 110 determines the type of workforce needed to implement current business strategy and goals for an upcoming planning period, such as, for example, over a long-range planning period, such as, for example, an upcoming six-month to fifteen-month period. According to embodiments, a long-range planning period comprises a time period longer than one week, a time period of two weeks, a time period greater than eight weeks, a time period of six months, or a time period between three and twelve months. According to embodiments, staff planner 110 evaluates current staff and forecasted labor demand for a future planning period at each site of a site group, such as, for example, group of one or more supply chain entities 120, to recommend the most cost-effective manner to satisfy the forecasted labor demand. In cases where forecasted labor demand would not be met by current staff, staff planner 110 suggests hiring new employees or cross training existing employees. Additionally, staff planner 110 may determine how to hire or cross train employees when a new site is added to a site group, such as, for example, opening a new retail store that does not contain any employees yet, or when new jobs are added to an existing site.

Additionally, as described in more detail below, staff planner 110 comprises a graphical user interface (GUI) that displays results generated by the various engines of staff planner 110. The GUI provides for modifying and configuring the long-range staff planning problem and selecting and modifying hiring and cross-training suggestions. After reviewing the displayed hiring and cross training suggestions, staff planner 110 may implement some or all the suggestions by, for example, adding new employees or adding additional jobs or roles to existing employees in supply chain network 100.

As described in more detail below, long-range staff planning problems and short-term scheduling problems may be expressed using MIP models. Long-range staff planning problem and short-term scheduling problem each comprise unique models and other models that are not MIP models. As described in more detail below, staff planner 110, in addition to generating long-range staff plans, may also create short-term schedules for shorter periods, such as for example, workforce schedules for one or two weeks, a month, a pay period, or the like. When creating short-term schedules, staff planner 110 may use a fine level of resolution, such as, for example, fifteen minutes, to generate work schedules for each employee at fifteen minute increments. However, when creating long-range staff plans, staff planner 110 may use a long-range staff planning model comprising a courser level of resolution, such as, for example, six hours, and, which provides for an employee to work a fraction of a time unit, rather than the short-term scheduling model's all or nothing requirement.

According to some embodiments, staff planner 110 supports scheduling process concurrency. According to these embodiments, one or more actions of a scheduling process, which comprises both long-range staff planning and short-term scheduling, are executed simultaneously, which reduces the time needed for on-demand, real-time scheduling runs. In addition, as described in more detail below, staff planner 110 divides a scheduling process into incremental pieces, which may be referred to as goals, which provides for easier testing and greater flexibility in creating and executing a scheduling process. Furthermore, constraint posting to and a validation process, as described in greater detail below, may be performed using the same code, or a portion of the same code, which avoids duplication of logic and reduces total lines of code dramatically. As explained in more detail below, constraint posting comprises applying constraints to one or more mathematical scheduling models.

Figure 2:
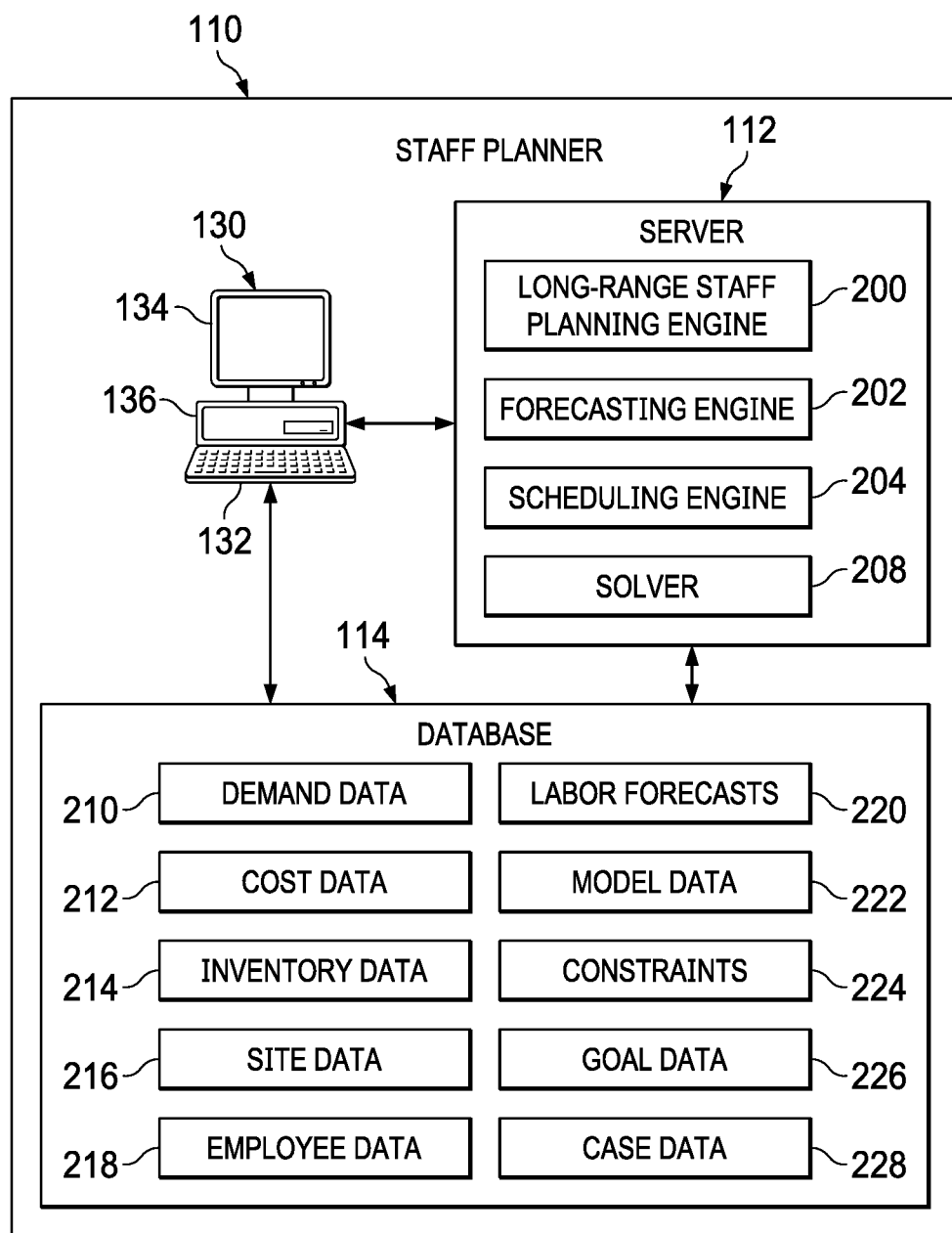
FIG. 2 illustrates the staff planner of FIG. 1 in greater detail in accordance with an embodiment.

FIG. 2 illustrates staff planner 110 of FIG. 1 in greater detail in accordance with an embodiment. As discussed above, staff planner 110 may comprise one or more computers 130 at one or more locations including associated input devices 132, output devices 134, non-transitory computer-readable storage media, processors 136, memory, or other components for receiving, processing, storing, and communicating information according to the operation of supply chain network 100. Additionally, staff planner 110 comprises server 112 and database 114. Although staff planner 110 is shown as comprising a single computer 130, a single server 112 and a single database 114, embodiments contemplate any suitable number of computers, servers, or databases internal to or externally coupled with staff planner 110.

Server 112 of staff planner 110 may comprise long-range staff planning engine 200, forecasting engine 202, scheduling engine 204 and solver 206. Although server 112 is shown and described as comprising a single long-range staff planning engine 204, a single forecasting engine 202, a single scheduling engine 204, and a single solver 206, embodiments contemplate any suitable number or combination of these located at one or more locations, local to, or remote from staff planner 110, such as on multiple servers or computers at any location in supply chain network 100.

Database 114 of staff planner 110 may comprise one or more databases or other data storage arrangement at one or more locations, local to, or remote from, server 112. According to embodiments, database 114 comprises demand data 210, cost data 212, inventory data 214, site data 216, employee data 218, labor forecasts 220, modeling data 222, constraints 224, goals 226, and cases 228. Although, database 114 is shown and described as comprising demand data 210, cost data 212, inventory data 214, site data 216, employee data 218, labor forecasts 220, modeling data 222, constraints 224, goals 226, and cases 228, embodiments contemplate any suitable number or combination of these, located at one or more locations, local to, or remote from, staff planner 110, according to particular needs. For example, according to some embodiments, database 114 is coupled with a workforce database and receives data from the workforce database on a predetermined basis, such as, for example, on a nightly basis.

In one embodiment, long-range staff planning engine 200 of staff planner 110 creates long-range staff planning problems, long-range staff plans, hiring and cross training suggestions, MIP and scheduling models, and comprises a graphical user interface to display and configure the foregoing. In accordance with the principles of embodiments described herein, long-range staff planning engine 202 generates long-range staff plans comprising the jobs and roles needed for a workforce for an upcoming long-range planning period, such as, for example, over the next six to fifteen months. According to embodiments, long-range staff planning engine 202 receives current employees and projected labor demand for a given period at one or more sites and recommends one or more hiring and/or cross training suggestions to meet the projected labor demand. Additionally, as described in more detail below, long-range staff planning engine 202 comprises a GUI that provides for displaying and configuring long-range staff planning problems, long-range staff plans, hiring and cross training suggestions, and MIP and scheduling models.

In one embodiment, forecasting engine 202 of staff planner 110 forecasts labor demand based, at least in part, on supply and/or demand forecasts for items of the one or more supply chain entities 120. For example, according to embodiments, forecasting engine 202 calculates the jobs or roles needed to meet the supply, demand, or both for items of one or more supply chain entities 120 in supply chain network 100 over a forecasting horizon, at least in part, on data relating to specific past, current, or future indicators and the data of promotions, seasonality, special events (such as sporting events), weather, and the like. According to embodiments, a job comprises a position of employment at one or more supply chain entities 120 associated with a set of one or more roles which are assignable to an employee having that job. A role comprises a task that is assignable to an employee in furtherance of the business interests of the one or more supply chain entities 120. Jobs and roles may be represented in staff planner 110 by a title or description.

According to embodiments, forecasting engine 202 may forecast the labor demand at the role level and derive job assignments from them.

In one embodiment, scheduling engine 204 of staff planner 110 generates workforce schedules for short-term periods, such as for example, workforce schedules for one or two weeks, a month, a pay period, or the like. When creating short-term workforce schedules, staff planner 110 may use a fine level of resolution, such as, for example, fifteen minutes, to calculate and generate work schedules for each employee at fifteen minute increments.

In one embodiment, solver 206 of staff planner 110 solves one or more MIP models expressing a long-range staff planning problem. As described in more detail below, long-range staff planning engine 202 uses a scheduling model to generate a MIP model comprising one or more constraints, variables, and a cost reduction objective function. Solver 206 generates one or more solutions to the MIP model which are used by long-range staff planning engine 202 to generate long-range staff plans and one or more hiring and cross training suggestions. According to embodiments, solver 206 generates a separate solution for long-range staff planning models and short-term scheduling models. A final solution is generated for both a long-range staff planning problem and a short-term scheduling problem from separate and unique lists of models combined to generate a final output. Long-range staff planning engine 200, forecasting engine 202, scheduling engine 204, and solver 206 will be discussed in more detail in connection with the method of FIG. 3 below. The various types of data stored in database 114 of staff planner 110 will now be discussed.

In one embodiment, demand data 210 of database 114 may comprise for example, any data relating to past, current, or futures sales, past, current, or future demand, purchase data, or the like of one or more supply chain entities 120. According to some embodiments, demand data 210 may comprise data relating to specific past, current, or future indicators and the data of promotions, seasonality, special events (such as sporting events), weather, and the like. Demand data 210 may be stored at time intervals such as, for example, by the minute, hour, daily, weekly, monthly, quarterly, yearly, or any suitable time interval, including substantially in real time.

Cost data 212 of database 114 may comprise any one or more general cost components of one or more items in the supply chain network 100, such as, for example, holding costs, batch costs, stockout costs, inventory costs, order costs, backorder costs, and backlog costs.

Inventory data 214 of database 114 may comprise any data relating to current or projected inventory quantities or states of one or more items. For example, inventory data 214 may comprise the current level of inventory for each item at one or more stocking points across the supply chain network 100. In addition, inventory data 214 may comprise order rules that describe one or more rules or limits on setting an inventory policy, including, but not limited to, a minimum order quantity, a maximum order quantity, a discount, target service levels, a step-size order quantity, and batch quantity rules. According to some embodiments, staff planner 110 accesses and stores inventory data 214 in database 114, which may be used by staff planner 110 to place orders, set inventory levels at one or more stocking points, initiate manufacturing of one or more components, or the like.

Site data 216 may comprise any data of the one or more supply chain entities 120 including, for example, identifiers of particular workgroups, jobs, roles, or sites (such as, for example, at Site ID) that uniquely identify the foregoing in the supply chain network 100. According to some embodiments, site data 216 includes site-specific data, such as, for example, the future labor demand needs, jobs and roles, entity and department open and close times, and the like of one or more sites or site groups. Employee data 218 may comprises data representing existing employees including, for example, jobs the employee can work, the availability times throughout a week, minor status limits on shift length and total hours in a week, and the like. In addition, or as an alternative, the data is stored in the database for a future time range, such as for example, six to fifteen months. Although, particular data and a time range is described, embodiments contemplate any data and/or time periods according to particular needs.

Labor forecasts 220 may comprise forecasts of labor demand based, at least in part, on supply and/or demand forecasts for items of the one or more supply chain entities 120. For example, according to embodiments, forecasting engine 202 calculates a future workforce demand, comprising particular jobs or roles needed to meet the supply, demand, or both for items of one or more supply chain entities 120 in supply chain network 100 over a forecasting horizon, based, at least in part, on data relating to specific past, current, or future indicators and the data of promotions, seasonality, special events (such as sporting events), weather, and the like.

Modeling data 222 may comprise scheduling models and MIP models. Scheduling models comprise one or more mathematical models for long-range staff planning and short-term scheduling.

Constraints 224 may comprise one or more conditions limiting solutions generated by solver 206. According to embodiments, categories of constraints may be, for example, static, dynamic, or model constraints. A static constraint may be created once at the beginning of a scheduling process from configuration parameters and does not change during scheduling. A static constraint can create static sub-constraints during an initialization process of the static constraint. A dynamic constraint may be created specifically for each model, as part of model initialization, and exist only for the lifespan of the model they were created for. According to embodiments, dynamic constraints are created from static constraints, when the static constraints are posted onto a long-range staff planning model. A dynamic constraint may be used, rather than a static constraint, if it depends on the particular characteristics of the model being solved in some way. For example, the lowest level labor demand constraints must be generated dynamically because they depend on the temporal resolution of the particular model being solved. According to embodiments, dynamic constraints are created during constraint posting. Model constraints comprise a lowest-level of constraints that all higher-level constraints are reduced to and, according to embodiments, are created dynamically during constraint posting.

To further illustrate, several examples of particular constraints are now given. In the following example, and in a long-range staff planning problem, constraints comprise limitations on possible schedules including maximum or minimum employee hours per week, per day, per period, or like period of time, time periods where an employee cannot work, and the like. According to some embodiments, constraints comprise structural limitations on the scheduling model, such as, for example, a constraint that ensures employees are only considered working during their shifts. Constraints may be posted onto scheduling models when long-range staff planning engine 202 determines that the constraint affects possible valid instantiations of one or more variables in the scheduling model.

Goal data 226 may comprise goals and goal configuration parameters. According to embodiments, goals comprise executable code that, when executed, performs a calculation or other action of a scheduling process. For example, a goal may comprise executable code configured to add shift variables to the scheduling model. This exemplary goal may take a configuration object (comprising sampled candidate shifts) and a scheduling model as its input and make changes to a scheduling model object as its output. In addition, goals may create and execute other goals in order to achieve to perform their actions. For example, an exemplary goal configured to schedule a site may create a sequence of sub-goals to complete the action. In one embodiment, goals may be created and executed immediately or stored for later execution. As described in more detail below, goals may be executed in parallel, when they do not interfere with each other. Also, as discussed in more detail below, one or more user goals may be added to introduce additional processing rules, to change configurations, to alter constraints, to add new constraints, and the like.

Case data 228 may comprises particular instances of scheduling problems and their variants. According to embodiments, case data 228 comprises data necessary for the one or more engines to execute and any results that the one or more engines have produced. According to embodiments, a case is defined by a client name, site ID, scheduling range, and a type of schedule to execute (i.e. long-range staff plan or short-term schedule). Variants of a case may comprise variations created to explore different ways of working with the data necessary for the scheduling engine 204 to work. According to embodiments, variants of a case comprise what if scenarios to identify the effects of different case conditions such as different versions of system engines and different employment scenarios, such as, for example, hiring only full-time employees, hiring and terminating employees in different orders, and the like. In one embodiment, this includes running different versions of the engine against the original data or varying the data in some way before executing the engine against it. In addition, there is at least one variant in every case, named "Original". An engine output file contains all the data necessary to create a single variant within a case. It is generated from a running workforce environment and contains both the source data sent to scheduling engine 204 and the output of the engine in place within the workforce environment.

As described in more detail below, each case may be configured using a GUI. The staff planner 110 interface provides for displaying and naming the client and site of the case, setting the start and end date/times of the extra data needed to properly generate the suggestions, setting the start and end date/times being planned for, the version of the engine used to generate the results, displaying results of running engine, displaying errors of running engine, displaying a shift strategy list with weekly values, and a shift strategy card with daily values.

Figure 3:
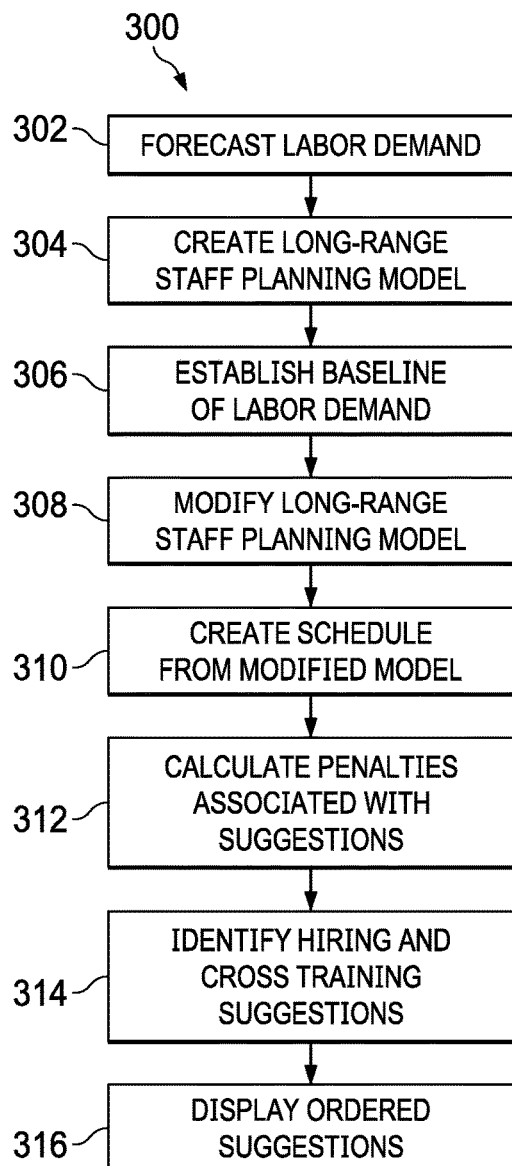
FIG. 3 illustrates an exemplary method of generating a long-range staff plan by the staff planner according to an embodiment.

FIG. 3 illustrates an exemplary method 300 of generating suggestions for a long-range staff plan by staff planner 110 according to an embodiment. The following method 300 proceeds by one or more activities, which although described in a particular order may be performed in one or more permutations, according to particular needs. Method 300 begins at activity 302, where forecasting engine 202 of staff planner 110 forecasts labor demands at one or more sites of the one or more supply chain entities 120. For example, according to embodiments, forecasting engine 202 calculates forecasts of labor demand based, at least in part, on supply and/or demand forecasts for items of the one or more supply chain entities 120. For example, according to embodiments, forecasting engine 202 calculates a future workforce demand, comprising particular jobs or roles needed to meet the supply, demand, or both for items of one or more supply chain entities 120 in supply chain network 100 over a forecasting horizon based, at least in part, on data relating to specific past, current, or future indicators and the data of promotions, seasonality, special events (such as sporting events), weather, and the like.

At activity 304, long-range staff planning engine 200 creates a long-range staff planning model. According to embodiments, creating a long-range staff planning model spawns various other models, including MIP models.

Figure 4:
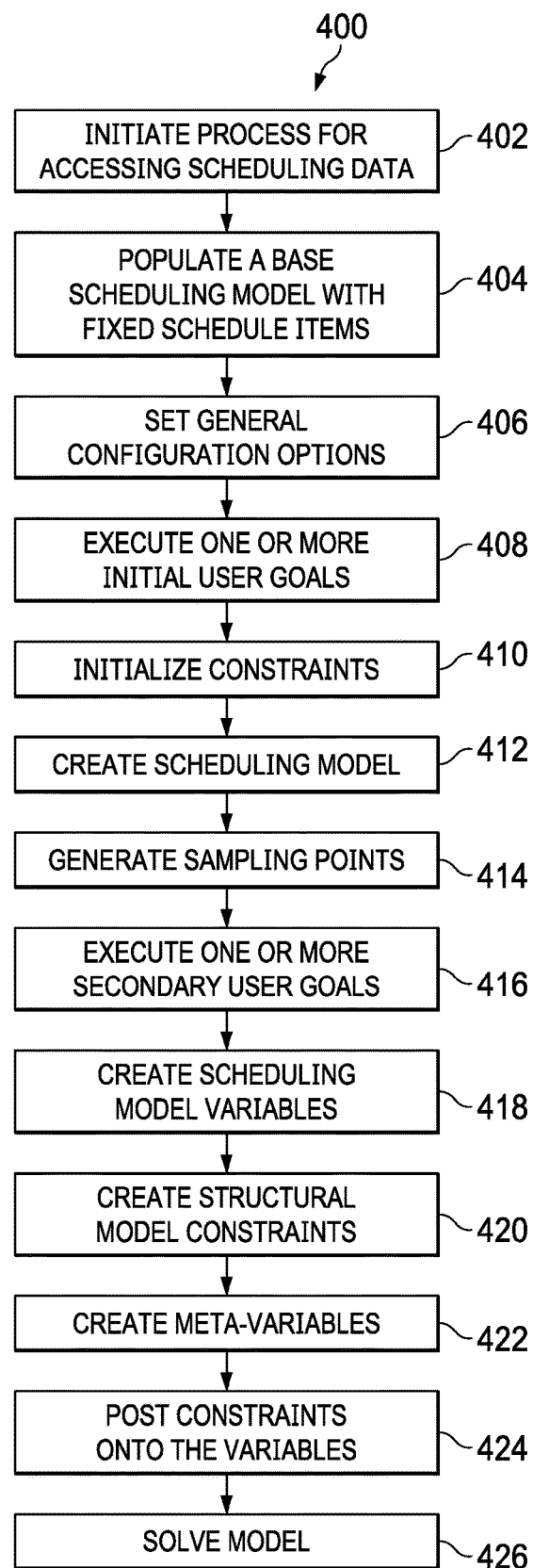
FIG. 4 illustrates an exemplary method of creating a scheduling model and a MIP model by the staff planner according to an embodiment.

According to embodiments, a scheduling model and MIP model are created by long-range staff planning engine 200, which proceeds by one or more actions of method 400 (FIG. 4).

FIG. 4 illustrates an exemplary method 400 of creating a scheduling model and a MIP model by staff planner 110 according to an embodiment. The following method 400 proceeds by one or more activities, which although described in a particular order may be performed in one or more permutations, according to particular needs.

At activity 402, long-range staff planning engine 200 initiates a process for accessing scheduling data from one or more databases, including database 114, in the supply chain network 100. For example, according to embodiments, long-range staff planning engine 200 initiates access to scheduling data. By way of example only and not by way of limitation, scheduling data comprises a selected portion of site data 216, employee data 218, labor forecasts 220, modeling data 222, constraints 224, goals 226, and/or cases 228. For example, long-range staff planning engine 200 receives one or more parameters associated with a long-range staff planning job, such as, for example, a Site ID or an Organizational Hierarchy ID, a planning period, and the like. According to embodiments, long-range staff planning engine 200 uses the parameters to retrieve only data that will be used in that particular run of the long-range staff planning job. For example, when long-range staff planning engine 200 receives an Organizational Hierarchy ID specified in the parameters of the scheduled job, long-range staff planning engine 200 may then spawn a child task for only valid workforce sites. A valid workforce site may comprise, for example, each of the one or more supply chain entities 120 that is open for at least some portion of the planning period and is a site associated with the Organizational Hierarchy ID specified in the parameters of the scheduled job.

According to a second example, when long-range staff planning engine 200 receives a planning period in the parameters of the scheduled job, long-range staff planning engine 200 may then access data for the workforce site associated only with the planning period specified in the parameters of the scheduled job. For example, according to some embodiments, long-range staff planning engine 200 accesses data from the start of a current week to the end of the plan duration. Therefore, the start date of the plan may be the first day of the labor week in which the job is run. However, other embodiments contemplate an exception to this planning period determination, such as, for example, when a plan start date equals the first day of the business week but the time when the job begins is earlier than the site's labor start time, then the plan start date will be set to the current day, not the previous week's first day of business. According to particular embodiments, a plan end date of the planning period may not be set more than 65 weeks beyond a plan start date and a default planning period is set to 12 weeks. Although particular durations of the planning period and the default planning period are described, embodiments contemplate any suitable duration for the planning periods, according to particular needs.

In addition to the site data 216, long-range planning engine 200 uses the parameters associated with the scheduled job to access or retrieve only a selected portion of other scheduling data. For employee data 218, for example, long-range planning engine 200 may retrieve the portion of employee data 218 where a current site identified in the parameters matches the home site of the status record and the current planning period overlaps the effective range of the status records, minus any employees who are configured as Not Scheduled. For the employees who match these criteria, the portion of employee data 218 that is retrieved by long-range staff planning engine 200, such as, for example, Employee IDs and/or employee name. If an employee's primary job is not part of the labor profile but they have a secondary job which is part of the labor profile, then the employee will be counted towards the coverage.

According to embodiments, long-range staff planning engine 200 retrieves labor forecasts 220 for labor runs and workgroups for the site specified in the parameters of the scheduled job for the given time range. Additionally, some embodiments of long-range staff planning engine 200 filters role demand that does not belong to a workgroup/job or that belongs to a job that is no longer assigned to the current site. When determining which employee role assignments are valid, long-range staff planning engine 200 filters out jobs and/or roles that are not assigned to the current site and also takes into account any current role exclusions. Both primary and secondary jobs, if any, are included, provided the job is active for the employee within the planning period of the long-range staffing plan.

Additionally, long-range staff planning engine 200 may access a labor profile from site data 216 and associated with the current site identified in the parameters. Based at least in part on the labor profile, long-range staff planning engine 200 retrieves all workgroups associated with the labor profile. From the group of retrieved workgroups, long-range staff planning engine 200 may then retrieve all jobs associated to those workgroups. From the resulting group of jobs, long-range staff planning engine 200 may then filter out any jobs that are not assigned to the current site. From the filtered list of jobs, long-range staff planning engine 200 may then pull all of the labor roles associated to those jobs. From this data, the long-range staff planning engine 200 may create a copy of a hierarchy of the workgroups/jobs/labor roles. Further, when retrieving scheduling data, long-range staff planning engine 200 may identify and retrieve any employee unavailability data, such as, for example, time off requests, minor laws, general availability, and employee status effects.

Additionally, when retrieving scheduling data, long-range staff planning engine 200 retrieves a portion of case data 228, such as, for example, the Min/Max weekly hours, the Min/Max daily hours, the Min/Max shift length, the Max days per week (not min), the Max consecutive days in week, the Max consecutive days across weeks, the Ability to work split shifts, and the Minor weekly values (including days per week and consecutive days), minor daily values, contract guaranteed hours and fixed shifts, with a validation for jobs that don't exist in any workgroups. For fixed shifts with a job the employee cannot work, long-range staff planning engine 200 adds a constraint for the fixed shift but does not add a job constraint. Finally, when retrieving scheduling data, long-range staff planning engine 200 retrieves all shift strategies currently assigned to the current site.

Figure 5:
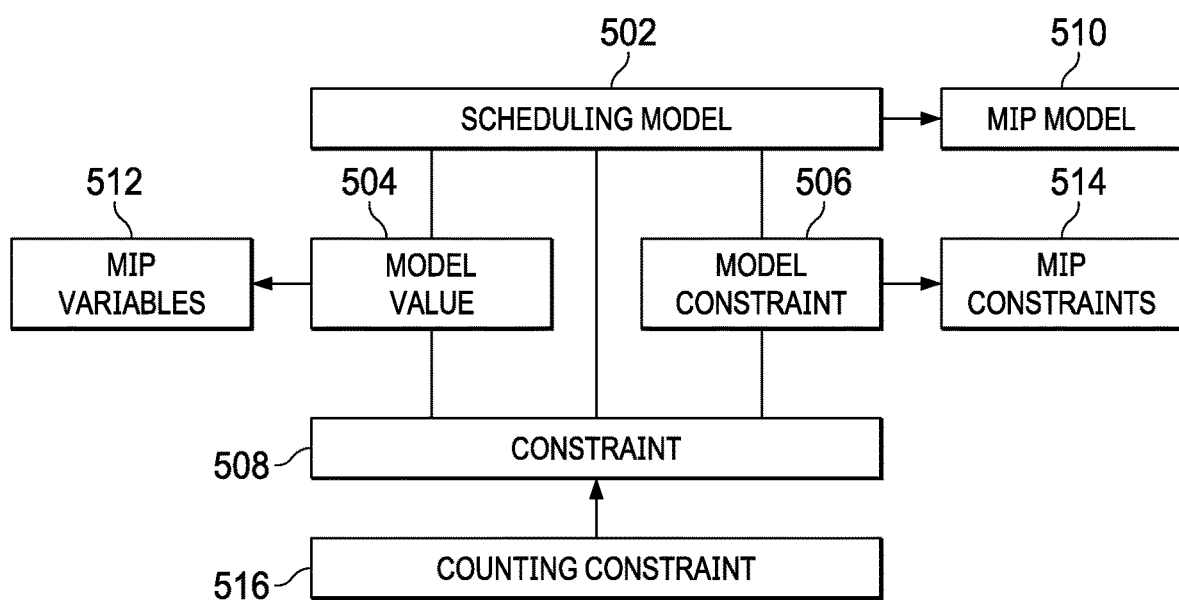
FIG. 5 illustrates a graphical flowchart of relationships between various data objects associated with the method of FIG. 4, according to an embodiment.

Returning to method 400, at activity 404, long-range staff planning engine 200 populates a base scheduling model 502 (FIG. 5) with any fixed schedule items of model values 504. According to embodiments, fixed schedule items comprise, for example, manual shifts. FIG. 5 illustrates graphical flowchart 500 of relationships between various data objects associated with method 400 of FIG. 4, according to an embodiment.

According to embodiments, scheduling model 502 comprises the data structures representing a long-range scheduling model and/or short-range scheduling model. According to embodiments, during execution of method 400, scheduling model 502 receives one or more model values 504 and model constraints 506. Scheduling model 502 receives a copy of high-level constraints that were created during problem initialization and/or which were relevant to scheduling model 502, and will store the copy as model constraints 506 as they are generated during posting of constraints. Model values 504 that are variable will be mapped to MIP variables when the model is solved, and model constraints 506 will be mapped to MIP linear constraints.

Model values 504 comprise data structures representing scheduling decisions. When the scheduling decisions have been made prior to a scheduling run, model values 504 comprise a fixed value. When the scheduling decisions are still undecided, model values 504 comprise a variable. For example, model values 504 may represent a particular employee, performing a particular shift, at a particular time, on a particular date, such as, for example, "Employee A performing a 7-hour shift starting at 8 a.m. Jan. $22^{nd}$."

Because schedules may be generated incrementally, such as, for example, refining a schedule in a number of steps, scheduling model 502 may depend on the results of optimizing an earlier instance of a scheduling model 502. In addition, or as an alternative, model values 504 may be altered in an already-optimized scheduling model 502 to represent the next step in the process and optimize it again. To reduce unnecessary storage, if one or more model values 504 do not exist at a particular locus, a fixed value of zero is assumed. A single model constraint 506 corresponds to a single linear constraint in a MIP model. The simplest, lowest level constraint—a linear constraint (<,>or =)—a set of (ModelValue, coefficient) pairs and/or a set of queries to get the (ModelValue, coefficient) pairs from the ScheduleModel. This constraint may be considered between meaningful real-world constraints (such as "employees don't work more than 40 hours per week") and low-level linear constraints.

Model constraints 506 instances are only created from within higher-level constraint posting, and a single user constraint may create many model constraints. According to some embodiments, model constraints 506 only live for the duration of lifespan of a scheduling model, whereas high-level constraints exist from the initialization of the entire scheduling problem throughout the rest of the scheduling process. In one embodiment, model constraints 506 are not hard constraints and allow violation at a cost. The over-and under-costs may be set and parameters may be given for a non-linear (piecewise linear) cost function, so a cost of violating the constraints increases super-linearly with an increasing amount of violation.

According to embodiments, counting constraint 516 may either be used directly or as part of a higher-level constraint. Counting constraint 516 adds up model values 504 as multiplied by constant coefficients (scalar product)) and either puts a linear constraint on the sum (<, >, =) or stores the sum as a constraint's meta-variable. The counting constraint 516 may be mapped directly to a single model constraint 506 during constraint posting, for each scheduling model 502. In addition, or as an alternative, it is noted that constraints may form trees. A static constraint may, for example, comprise static sub-constraints. Static sub-constraints, in turn, may comprise their own static sub-constraints, and so on. Similarly, constraints may generate trees of dynamic sub-constraints, since a dynamic sub-constraint may create its own child dynamic sub-constraints, and so on. At the bottom of the dynamic constraint tree are model constraints 506 that map directly to linear constraints.

In accordance with the principles of embodiments described herein, the planning module supports meta-constraints. According to embodiments, meta-constraints comprise constraints on constraints, such as, for example, "an employee works <40 hours in the week OR they work 40-50 hours with Friday night and Sunday off." According to other embodiments, a constraint may be associated with a meta-variable, when meta-support is implemented for the constraint. By way of example and not of limitation, a meta-variable may comprise a binary [0,1] variable that is 1 if the constraint is true (i.e. if the constraint holds) or 0 if the constraint is false. In addition or as an alternative, a further embodiment may comprise dropping the second requirement that the variable is 0 if the constraint is false. For this embodiment, if the constraint is false the variable may take either value in a solution.

In another embodiment, a meta-constraint may be no different from any other constraint. For example, counting constraint 516 may comprise a meta-constraint. The difference may be that model values 504 associated with a meta-constraint are the meta-variables from other constraints. According to embodiments, model constraints comprise the lowest level of constraint, i.e. the basic constraint that maps (more-or-less) directly onto a single MIP linear constraint (MIP constraints 514). According to embodiments, model values 504 represent a decision in the schedule that is either a decision to be made (variable) or a decision that has already been made (fixed value). If the value is known (e.g. manual shift, then it is "fixed", but if it may be changed by the optimization, it is variable). If model value 504 is a "variable" type, it may still have a value set by optimization, which is the current tentative value for this data point. This value may be used as the basis for determining the behavior of later models.

MIP model 510 may, according to embodiments, comprise a low-level MIP model, serve as a communication bridge between long-range staff planning engine 200 and solver 206, comprise its own MIP variables 512 and MIP constraints 514 capable of directly mapping to MIP variables and linear constraints. According to embodiments, one or more goals are defined that creates MIP model 510 from a populated scheduling model 502 (such as, for example, scheduling model 502 with model values 504 and posted model constraints 506), translates model constraints 506 into MIP constraints 514, translates variable model values 504 into MIP variables 512, and solves the model.

According to embodiments, scheduling model 502 comprises a single model and embodies the features of several model types. For example, scheduling model 502 comprises three time horizons, three types of modeling used on different days, a "shift modeling" horizon (A), "shift cover modeling" horizon (B), "aggregated" (C), with A<=B<=C. These may be listed in order of decreasing accuracy (and increasing efficiency for solving). According to embodiments, a shift modeling horizon comprises a shift represented by a start time and an end time. According to embodiments, a shift cover modeling horizon comprises very coarse time buckets. A shift is represented by the start/end of a minimal "cover" of the shift (i.e. the smallest period that covers the shift and starts/ends on the sparse sample points), plus aggregated work variables for each time bucket (i.e. how much time do they actually work within each bucket of the cover). According to embodiments, an aggregated horizon comprises no shifts and no cover. According to this scheduling model time horizon, the scheduling model represents if the employee is working on this day and the aggregated hours the employee works (aggregated into large time buckets, such as, for example, 6-hour buckets).

Some constraints will have to be able to deal with these different ways of modeling shifts, which can be a little complex. Some constraints may not make sense for one or two of these modeling methods and so should not be applied (or "posted") on days that use those methods. According to embodiments, constraints and scheduling model may be bridged by a translator goal. When no translator is present, the constraints are not applied.

At activity 406, long-range staff planning engine 200 sets general configuration options for the number of weeks in the planning horizon and the identity of shift strategies that are allowed to be used for hiring suggestions. According to embodiments, long-range staff planning engine 202 populates a general configuration with information about which algorithm to use.

At activity 408, long-range staff planning engine 200 executes one or more initial user goals. For example, according to embodiments, long-range staff planning engine 200 executes one or more goals 226 to, for example, add an algorithm goal to the long-range planning engine 200, create or modify constraints (such as, for example, changing a meta-value type associated with one or more constraints), and the like. At activity 410, long-range staff planning engine 200 initializes one or more constraints. For example, according to embodiments, long-range staff planning engine 200 calls an Initialize( )call on one or more constraints, which initializes the one or more constraints, which may create their own sub-constraints and the like.

At activity 412, long-range staff planning engine 200 creates scheduling model 502 For example, according to embodiments, long-range staff planning engine 200 executes one or more goals 226, for to create a scheduling model 502 based, at least in part, on all or a portion of the base scheduling model 502 and a partition. According to embodiments, partitions comprise groups of employees whose job schedules do not affect the schedules of other employees. For example, pharmacy workers in a grocery retailer will never work outside the pharmacy, and non-pharmacy employees never work inside the pharmacy. By separating employees into partitions, the runspeed of performing one or more actions greatly increases. According to embodiments, long-range staff planning engine 200 creates one or more filtered copies of constraints 224 in the base scheduling model 502.

At activity 414, long-range staff planning engine 200 generates sampling information. For example, according to embodiments, long-range staff planning engine 200 executes one or more goals 228 to identify sampling information for scheduling model 502. According to embodiments, sampling information comprises one or more sample points and a filtered set of candidate shifts. According to embodiments, sampling information may be stored in one or more databases, such as database 114, of supply chain network 100 to be use with future runs of scheduling models 502.

At activity 416, long-range staff planning engine 200 executes one or more secondary user goals. For example, according to embodiments, long-range staff planning engine 200 executes one or more goals 228 on scheduling model 502 to, for example, remove one or more shift candidates and the like. At activity 418, long-range staff planning engine 200 creates scheduling model 502 variables. For example, according to embodiments, long-range staff planning engine 200 executes one or more goals 228 to create one or more scheduling model variables and/or model values 504.

At activity 420, long-range staff planning engine 200 creates structural model constraints. For example, according to embodiments, long-range staff planning engine 200 executes one or more constraints 224 and/or goals 226 to create structural model constraints. Structure model constraints comprise constraints that do not change from site-to-site but which are still part the model, such as, for example, each day having 24-horus. At activity 422, long-range staff planning engine 200 creates one or more meta-variables. For example, according to embodiments, long-range staff planning engine 200 initializes one or more constraints, which may then create one or more meta-variables in scheduling model 502.

At activity 424, long-range staff planning engine 200 posts constraints onto one or more variables. For example, according to embodiments, long-range staff planning engine 200 posts constraints onto variables, which may create meta-variables. According to some embodiments, constraints are not permitted to create scheduling model variables, other than their own temporary variables and meta-variables. At activity 426, long-range staff planning engine 200 executes one or more goals 228 to solve the model. For example, according to embodiments, long-range staff planning engine 200 executes one or more goals 228 to solve the model and generate a solution.

Returning to method 300, at activity 306, long-range staff planning engine 200 establishes a baseline of labor by an initial run of long-range staff planning model. According to embodiments, long-range staff planning engine 200 initiates solver 206 to solve the long-range staff planning model using existing employee data to establish a baseline measurement of labor needs over the planning horizon.

At activity 308, long-range staff planning engine 200 modifies the long-range staff planning model by allowing existing employees to work more than one job and creating simulated employees. The model is modified in two ways before being executed the second time. Existing employees are allowed to work additional jobs they could not before. Additional constraints are placed on the model assigning the employee to work these jobs to allow the model to assess the value of letting an employee work an additional job. Simulated employees are added to represent potential new hires. These simulated employees represent potential hires with a variety of availability and jobs based on the results of the first model execution.

At activity 310, long-range staff planning engine 200 generates schedule with simulated employees and employees working more than one job. According to embodiments, long-range staff planning engine 200 initiates solver 206 to solve the long-range staff planning model using the modified long-range staff planning model. Existing employees will receive different working times and job assignments as the model uses the extra job options and simulated employees to better meet the overall labor needs. At activity 312, long-range staff planning engine 200 calculates a penalty associated with each hiring of a simulated employee or cross-training of an existing employee. At activity 314, long-range staff planning engine 200 generates a list of hiring and cross-training suggestions for display and prioritizes the list based, at least in part, on the calculated penalty.

At activity 316, long-range shift planning engine 200 identifies hiring and cross-training suggestions. According to embodiments, there are two exemplary ways in which the long-range staff planning engine 200 of staff planner 110 tries to improve labor demand coverage—either by suggesting recruitment of employees for particular jobs or by cross-training existing employees. If several suggestions offer the same level of labor coverage, long-range planning engine 200 may favor one with fewer hiring suggestions and more cross training. Embodiments also provide for suggesting a single appropriate hiring over a similar result requiring multiple cross trainings.

Continuing with this example, when long-range shift planning engine 200 chooses cross training for specific, named employees, it takes into account their availability and one or more other constraints (such as, for example, maximum or minimum weekly hours, and the like.). To produce a cross train suggestion, long-range shift planning engine 200 calculates the total residual labor demand for the week by role, and then for each of these residual roles (determined by meeting some minimum threshold, such as, for example an average of 4 hours per week), long-range shift planning engine 200 searches and selects employees with spare capacity who are not currently trained for the role but who might be trained in it. According to embodiments, long-range planning engine 200 selects employees who may be trained for a role by selecting employees in a workgroup which has a job containing the role to be filled. Long-range shift planning engine 200 may then determine which of these employees to select for cross training suggestions to best cover residual demand based, at least in part, on a reduction in cost. All of the suggestions, including the alternatives listed within each cross training suggestion, may then be ranked and displayed in order of priority, cost reduction, and the like.

According to an embodiment, long-range staff planning engine 202 may enforce one or more restrictions or assumptions when modeling the scheduling model 502. For example, when generating a cross training suggestion, long-range staff planning engine 202 may require that a cross training suggestion is for a single job. By way of a further example, long-range staff planning engine 202 may require that once an employee is trained in a job, he or she will be able to perform all roles that belong to that job for the rest of a planning period. Other examples of assumptions or restrictions that may be enforced on scheduling model 502 by long-range staff planning engine 202 include, but are not limited to, cross training suggestions may require training an employee in any job in the employee's current workgroup, cross training suggestions may require training an employee in any job in any of the employee's former workgroups, an employee will be cross trained in a maximum number of jobs (such as one) over a planning period, cross training suggestions are associated with penalties for that suggestion in isolation (which may provide for an alternative list of employees for each cross training suggestion while taking into consideration that each of these alternate employees may also be the primary in a separate cross train suggestion), and the like.

According to embodiments, solver 206 solves the long-range staff planning problem by finding solutions that minimize a penalty assigned to various decisions. According to embodiments, decisions assigned a penalty include, but are not limited to, hiring suggestions, cross training suggestions, failing to fill a role predicted by a labor forecast (which may be referred to as under-coverage), filling a role not predicted by a labor forecast or scheduling an employee to work when not assigned to a role (either or both of which may be referred to as over-coverage), an employee working whether assigned to a role or not, and the like. According to embodiments, and in the following example, exemplary penalties assigned to the various decisions comprise 800 points for a hiring suggestions, 400 points for a cross training suggestion, 50 points per employee per time unit for under-coverage (each time unit may comprise any suitable unit of time, such as, for example, 15 minutes, 30 minutes, one hour, two hours, and the like), 30 points per employee per time unit for over-coverage (according to some embodiments, over-coverage penalty is set to a very high number, such as, for example, 1000, and 30 points per employee per time unit for an employee working (whether or not assigned to a role). Although particular points are assigned to particular scheduling decisions, embodiments contemplate any suitable number of points for any particular scheduling decisions, according to particular needs.

Additionally, according to some embodiments, an under-coverage penalty increases non-linearly in order to spread under-coverage out over time. In the above examples, a 50 point penalty was assigned for each time unit of under-coverage in a role against a 30 point penalty for each time unit of work. Scheduling engine 204 may represent this as setting of 40% for a maximum percent of over-coverage. Further, as stated above, over-coverage may occur either (1) when filling a role not predicted by a labor forecast or (2) scheduling an employee to work when not assigned to a role. According to some embodiments, the penalty associated with filling a role not predicted by a labor forecast is set to a penalty high enough that solver 212 never makes this decision when solving the long-range staff planning problem, and the penalty associated with scheduling an employee to work when not assigned a role is set to zero or thirty penalty points. An employee may be scheduled to work without an assigned role because of laws, regulations, or contracts that require weekly minimum hours, contract hours, or daily shift length minimums. For example, long-range staff planning engine 204 may assign an employee extra hours in a day leading to over-coverage. However, embodiments contemplate a constraint setting a maximum percentage of over-coverage allowed in a day, such as, for example, a maximum over-coverage percentage of 35%. According to this embodiment, when solver 206 provides a solution to the long-range staff planning problem, it will not allow more than 35% of the work an employee does in a day to be over-coverage.

Continuing with this example, if solver 206 cannot find a solution that meets this restriction, the solver 206 may, instead, not schedule the employee for any role in that day, which (which may lead to violations of minimum weekly hours or contract minimum hours). Because going below weekly minimum or contract minimum imposes a high penalty, some embodiments of long-range staff planning engine 202 will not suggest any recruitments that would violate these minimums, nor would it suggest a recruitment that would an existing employee to violate these minimums that would cause such a thing to happen (minimum hours violations), nor should it do any recruitments that would cause an existing employee to violate one of these minimums. According to embodiments, one or penalties are calculated at different points in a scheduling process.

According to embodiments, an initial penalty, P1, a unit-less number scale that relates the undesirability of various model choices, may be determined by an initial pass according to Equation 1:

$$\Sigma under + \Sigma over + \Sigma emp + \Sigma oth = P1 \qquad (1)$$

Where, $\Sigma under$, the total under coverage, comprises a total penalty paid for not filling a role during a predicted need; $\Sigma over$, the total over coverage, comprises a total penalty paid for filling a role during no predicted need; $\Sigma emp$, the total employee penalty, comprises the total penalty accrued for not meeting employee scheduling requirements (such as, for example, total hours per week or days per billing period, where each different type of violation may have a different penalty value assigned to it); and $\Sigma oth$, the total other penalty, comprises the total for penalties of other restrictions placed on the model. To further illustrate, an example is now given. If, for example, during an initial pass, thirty-five roles were not filled during scheduled times and fifty-five roles were filled when they were not needed, based on the labor forecast, and the penalties associated with under coverage is fifty points, with over coverage is thirty points, and no penalties occurred for employee or other penalties, then the total initial penalty is 54,150 (i.e. (35*50)+(55*30)+(0)+(0) =54,150).

In addition, penalties may be assigned to each suggestion, to represent the cost and time of hiring and/or training. The suggestion penalty, P2, a unit-less number scale that relates the undesirability of various suggestions, may be determined according to Equation 2:

$$\Sigma under + \Sigma over + \Sigma emp + \Sigma oth + \Sigma R + \Sigma C = P2 \qquad (2)$$

Where, $P2 <= P1$, $\Sigma R$, the total hiring penalty, comprises a total penalty to recruit hire new employees; and $\Sigma C$, the total cross train penalty, comprises a total penalty cost to cross train existing employees. To further illustrate, an example is now given. If for example, during a suggestion prediction activity, the penalty of a single hire is 800 points and the penalty of cross training is 400 points, then the result of hiring one person and cross training two more must reduce the total of other penalties by at least 1600 points (i.e. 800+(2*400)).

Additionally, embodiments contemplate ordering suggestions by how much they reduce the overall penalty. According to this embodiment, instead of letting the model choose the suggestion, the suggestions may be locked in place and long-range staff planning engine 200 replaces the penalty for each suggestion with a variable. In addition, or as an alternative, the model is forced to accumulate the total number of penalty points from the first pass (P1) rather than try to reduce the penalty overall. In addition, the model assigns a penalty to each suggestion, wherein the amount represents the total reduction of penalty that suggestion absorbed. Additionally, or in the alterative, each suggestion is removed one at a time and the total penalty is calculated with the suggestion removed, and that total penalty is compared with P2.

In addition, or as an alternative, long-range staff planning engine 202 may perform a validation process. A validation process may, for example, execute a copy of a base scheduling model with no variables other than any meta-and temporary variables created by one or more constraints. According to embodiments, a validation process makes use of the existing constraint structure to validate a schedule.

Schedule validation may be performed on a new schedule that has just been auto-scheduled, or on an existing schedule from database 114.

A validation process may comprise, for each model constraint 506, long-range staff planning engine 200 validates the linear constraint and reports any violation (i.e. violation penalties). According to embodiments, the validation process may be automated and performed bottom-up. For example, model constraints 506 may first be validated. Any violations they find are passed up to their parent constraints. Next, the parent constraints are validated, and so on, up the constraint hierarchy to the root of a constraint tree. According to embodiments, a validation process generates a validation report comprising, for example, information about the violation, such as, for example, violation severity, amount of violation, violation description, and the name of the constraint class where the violation occurred.

In addition, or as an alternative, embodiments contemplate a debugging report that reports all violations down to the lowest level, even if they are summarized higher up. This data is naturally hierarchical and may be shown in a user interface as a tree with expandable nodes, which can be drilled down, even to individual model constraints 506. According to embodiments, long-range staffing planning engine 202 displays a GUI for displaying scheduling results and configuring parameters of scheduling models and problems.

Figure 6:
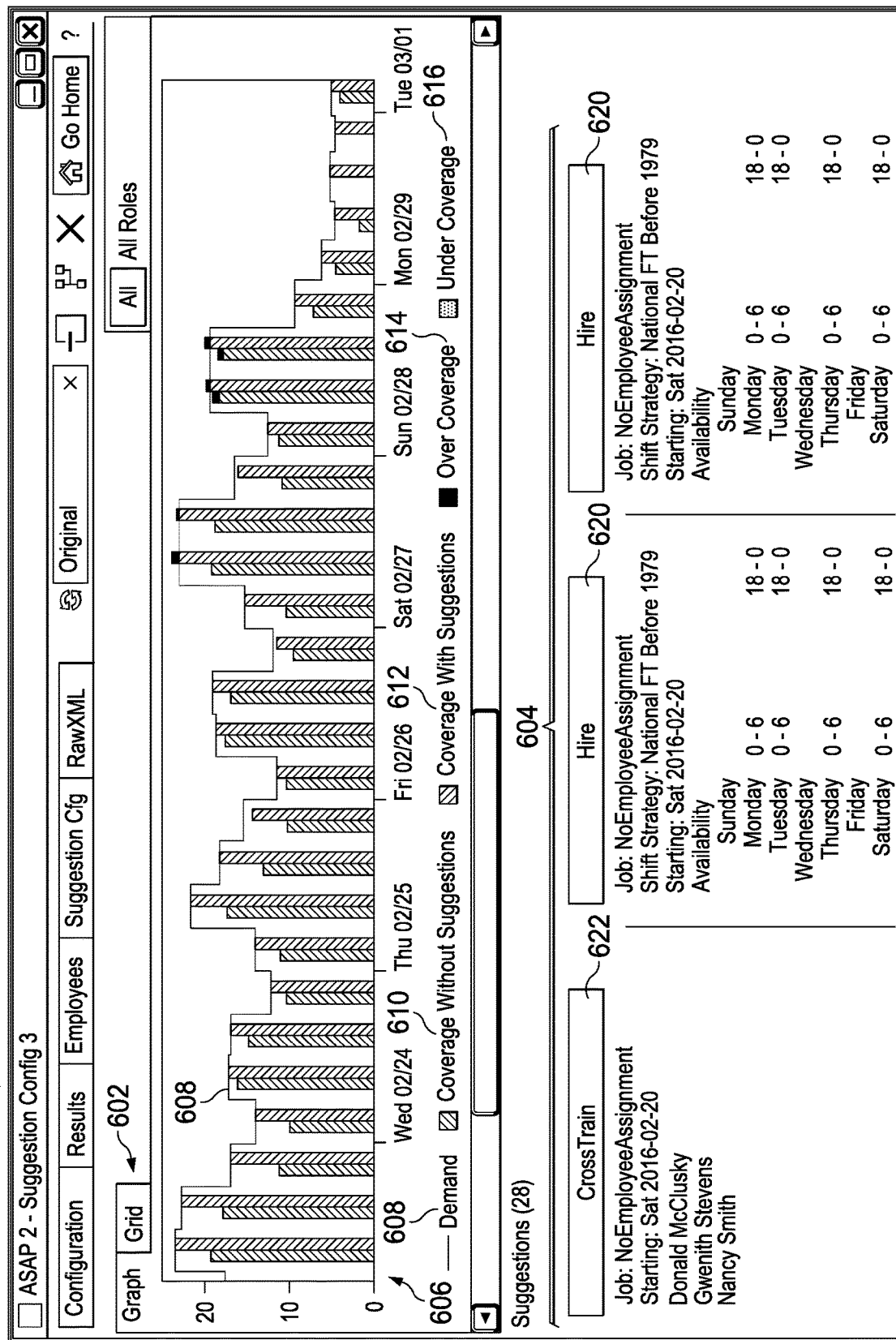
FIG. 6 illustrates a results page interface of the staff planner, according to an embodiment.

FIG. 6 illustrates results page interface 600 of staff planner 110, according to an embodiment. Results interface 600 comprises graph and grid switcher 602 and suggestions cards 604. According to embodiments, graph and grid switcher 602 provide for switching between a graph or grid view of labor coverage and demand. According to embodiments, a planning grid or graph are displayed for all workgroups, jobs, and roles. The data in the planning grid reflects the results for the entire long-range planning period, whereas the data in graph 606 is representative of a single week within the planning period. A drop-down box may provide for selecting a particular workgroup to display on the graph or grid. The workgroups are listed in the drop-down list. Upon selection of a particular workgroup from the drop-down list, the jobs in the selected workgroup are then auto-populated in the drop-down list showing jobs. Similarly, upon selection of a particular job from the drop-down list, roles in the selected job are then auto-populated in a drop-down list showing roles. The grid and/or graph 606 are then filtered with the planning information for the selections made.

Graph 606 displays a current demand coverage versus coverage with suggestions, pictorially and includes demand 608, coverage without suggestions 610, coverage with suggestions 612, over coverage 614, and under coverage 616. According to embodiments, graph 606 comprises an x-axis displaying one or more days and each of the four six-hour time buckets throughout each of the displayed days. Additionally, values on a y-axis may dynamically change to accommodate varying demands and coverage levels. Navigation buttons allows scrolling forward or backward through days of a displayed planning period. For example, demand 608 comprises a labor demand based on labor forecasts of forecasting engine 202. According to embodiments, this value is displayed for each day and for each separate 6-hour time bucket.

Coverage without suggestions 610 comprises current job or role coverage prior to implementing any hiring or cross training suggestions. Coverage with suggestions 612 comprises a job or role coverage if one or more hiring or cross training suggestions indicated in suggestion cards 604 are implemented. Over coverage 614 comprise the current number of employees above the demand requirements prior to suggestions. Under coverage 616 comprises a current number of employees below the demand requirements prior to suggestions. In addition, or as an alternative, embodiments contemplate displaying an indicator when the coverage matches exactly the forecasted labor demand for a particular time period.

To further illustrate, an example is now given. In the illustrated example, demand 608 is represented by a line representing the job or role needs of the exemplary store. For example, for Saturday (02/27) in the second six-hour time bucket, the store needs a total of 23 people in the store. Coverage without suggestions 610 is indicated by a bar that shows that, with the current set of employees and the employees' current job skills, 18 of the forecasted labor demand can be met, without hiring or cross training anyone. However, if one or more of the cross training or hiring suggestions indicated in the suggestion cards 604 are selected, then a total of 24 of the forecasted labor demand will be filled, which indicates over coverage of one employee. In addition, although illustrated example displays a single week forecast, embodiments contemplate the long-range staff planning engine 200 to estimate, for example, six months, a year, or longer time periods. In these embodiments, cross training and hiring suggestions may include a suggestion to hire someone in two months, instead of hiring someone today or this week.

According to embodiments, suggestions cards 604 comprise hiring and cross training suggestions based on the results of the long-range staff planning problem. Suggestions cards 604 may comprise a hiring suggestion card 620 and a cross training suggestion card 622. Hiring suggestions card 620 indicates the suggestion of adding a new employee to the site and comprises for example, job or role, shift strategy, starting date, and required availability. Cross training suggestions card 620 indicates the suggestion of training an existing employee in an alternate job or role and comprises, for example, job or role, starting date, and one or more employees capable of being cross trained for the position.

According to embodiments, hiring suggestion card 620 comprises job (or role) field, suggested shift strategy, starting date, and minimum availability. According to embodiments, cross training suggestion card 622 comprises job (or role) field, starting date, and suggested employees. Job (or role) field comprises displays the name of the job (or role) associated with the suggestion. For hiring suggestions, this indicates the primary job recommended for the new employee. For cross training suggestions, this indicates the job in which the current employee should be trained. Starting date field comprises the recommended date start date for a new employee to begin (for hiring suggestion) or an existing employee to have completed a cross training (for cross training suggestions). It may be a future date if the suggested action does not need to be implemented right away.

Suggested shift strategy field may be used only used for hiring suggestions. The long-range staff planning engine 200 may choose a job and shift strategy combination for each hiring suggestion such that it produces the best labor coverage for the lowest total cost. A minimum availability filed comprises the days and times minimally required for the hiring suggestion to meet the forecasted labor demand. For example, beginning with a site's start time, the day's twenty-four period may be divided up into four equal 6-hour time buckets, represented by the specified values that follow each day. Because the granularity for generating minimum availability is a 6-hour time period, it is possible that an employee may not be needed for the entire indicated time, merely that the time during which the employee is needed falls within this time bucket.

Suggested employee field may be used only when a cross training suggestion is made. Suggested employee field may comprise a list of employees suggested for the cross training, ranked in the order of preference that would allow long-range staff planning engine 202 to make the most optimal choice. For example, according to embodiments, the first employee in the list is used by long-range staff planning engine 202 to display the coverage graph information. Additionally, according to some embodiments, suggestions cards 604 may be presented in an order of preferability, based on, for example, the least cost to one or more supply chain entities 120. In addition, or as an alternative, each of the one or more suggestions cards 604 may comprise a score based, at least in part, on the cost to implement the suggestion or a penalty score, calculated as described above. Further, embodiments contemplate end-dating cross training and hiring suggestions such that, for example, suggestions may recommend when to lay off an employee when a labor demand is forecasted to decrease.

To further illustrate suggestion cards 604, an example is now given. In the following example and according to the long-range staff plan illustrated, long-range staff planning engine 200 generated three suggestion cards 604. As discussed above, long-range staff planning engine 200 may present the suggestion cards in an order of priority from least to greatest cost. In most cases, a cross training suggestion will cost less than a hiring suggestion. Here, a first suggestion card comprise a cross training suggestion for a job described as "Cashier" For this cross training suggestion, three employees are presented and, as described above, the employees may be listed in order of priority from least to greatest cost. Here, cross training suggestion card 522 indicates that, when Deanie McClendon is cross trained, the schedule improves at the least cost. Additionally, long-range staff planning engine 200 presents alternatives to cross training Deanie McClendon. Two other employees may be cross trained (Geralyn Cruso or Nancy Simmons), or, an employee may be hired according to the hiring suggestion cards 620. As can be seen from the suggested availability, the hired employee would need to be available from 8pm until 6am, an overnight shift. If someone were hired for this position to work an overnight shift, then the future schedule would be improved.

As discussed above, suggestion cards 604 are ordered based on a priority, which may be based on a minimization of a cost or a penalty. That is, the first suggestion card has the largest impact by reducing the penalty or cost the most. For example, as shown above, the cross training suggestion card 622 eliminates the highest number of penalty points that are accrued. The penalty point system ensures that long-range staff planner 200 is prevented from just over-scheduling employees to meet demand because penalties accrue when, for example, am employee exceeds, for example, a maximum hours per week and a maximum shift length. This ensures gaps in long-range staff plans are spread throughout the week and throughout the day, so that, instead of having no cashiers during a particular shift (such an evening shift), long-range staff planner 200 plans a small amount of missing cashiers throughout the day. In addition, by allowing long-range staff planning engine 200 to make cross training and hiring suggestions, long-range staff planning engine 200 may minimize penalties, not only be spreading out gaps, but also by calculating a long-range staff plan with possible cross trained employees or with new employees having availabilities and skills to meet the gaps.

To further illustrate, an example is now given. For example, if a site needed five cashiers in the morning, but only three were available, there would still be two cashiers missing, and for each cashier missing penalty points would be accrued. The amount of penalty points may be weighted based on how far away the goal is. For example, if one cashier is missing, there may be five penalty points associated with this situation. If two cashiers are missing, then there may be fifteen penalty points with that situation. The penalty points assigned, in this example, are non-linear penalty points. In addition, or as an alternative, there may also be penalties assigned to not meeting an employee's minimum hours. For example, an employee is promised fifteen hours a week, however, if the employee is only scheduled for fourteen hours, then additional penalty points may be accrued, based on not meeting this constraint. In addition, if an employee is overscheduled, then penalty points may also be associated with that situation. Therefore, according to various embodiments, for each kind of requirement that is expressed in the data, embodiments contemplate a penalty point value assigned for not meeting that requirement.

Figure 7:
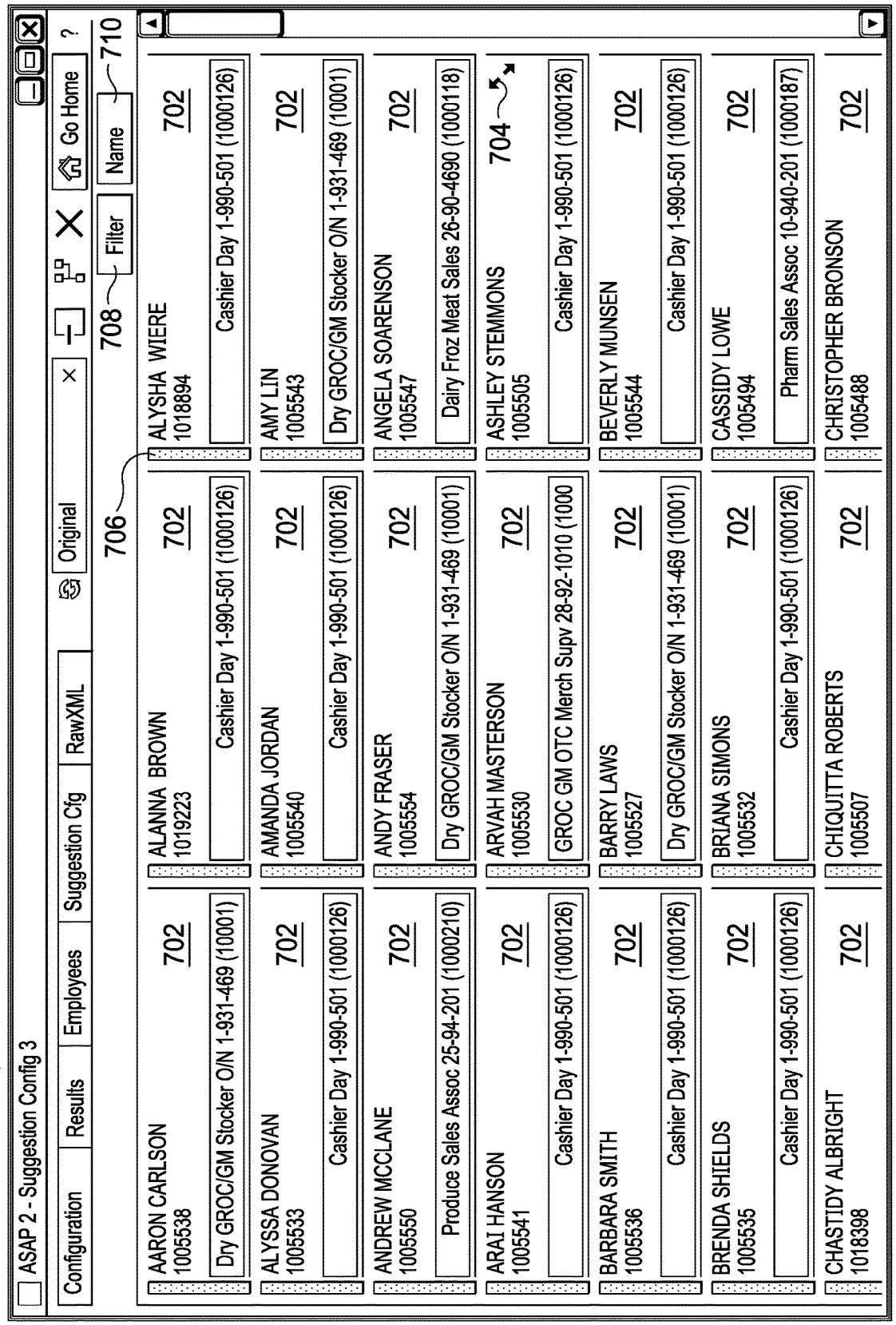
FIG. 7 illustrates an employee cards interface of the staff planner, according to an embodiment.

FIG. 7 illustrates employee cards interface 700 of staff planner 110, according to an embodiment. Employee card interface 700 comprises employee cards 702 which display employee name, internal ID, and primary job. User selection of a particular card, such as, for example, by selecting an expand button 704 or double-clicking an employee card 702, causes Employee card interface 700 to display more details about the employee associated with the selected employee card 702. Each card may be associated with an issue indicator 706 which indicates if an issue or violation occurred when scheduling for that employee. Issue indicator 706 may comprise, for example, a colored bar displayed with each employee card 702, where the color of the bar indicates whether an issue or violation occurred, the type of issue or violation that occurred, or the like. For example, violation indicator 706 comprising a green color may indicate that no issue or violation occurred, while violation indicator 706 comprising a red color may indicate that an issue or violation did occur. Employee card interface 700 may also comprise filter button 708 and sort dropdown 710. Selection of filter button 708 provides for viewing and/or changing current settings of the filter which selects which employee cards 702 to display. Selection of sort dropdown 710 provides for changing the criteria for the order in which the employee cards 702 are displayed.

Figure 8:
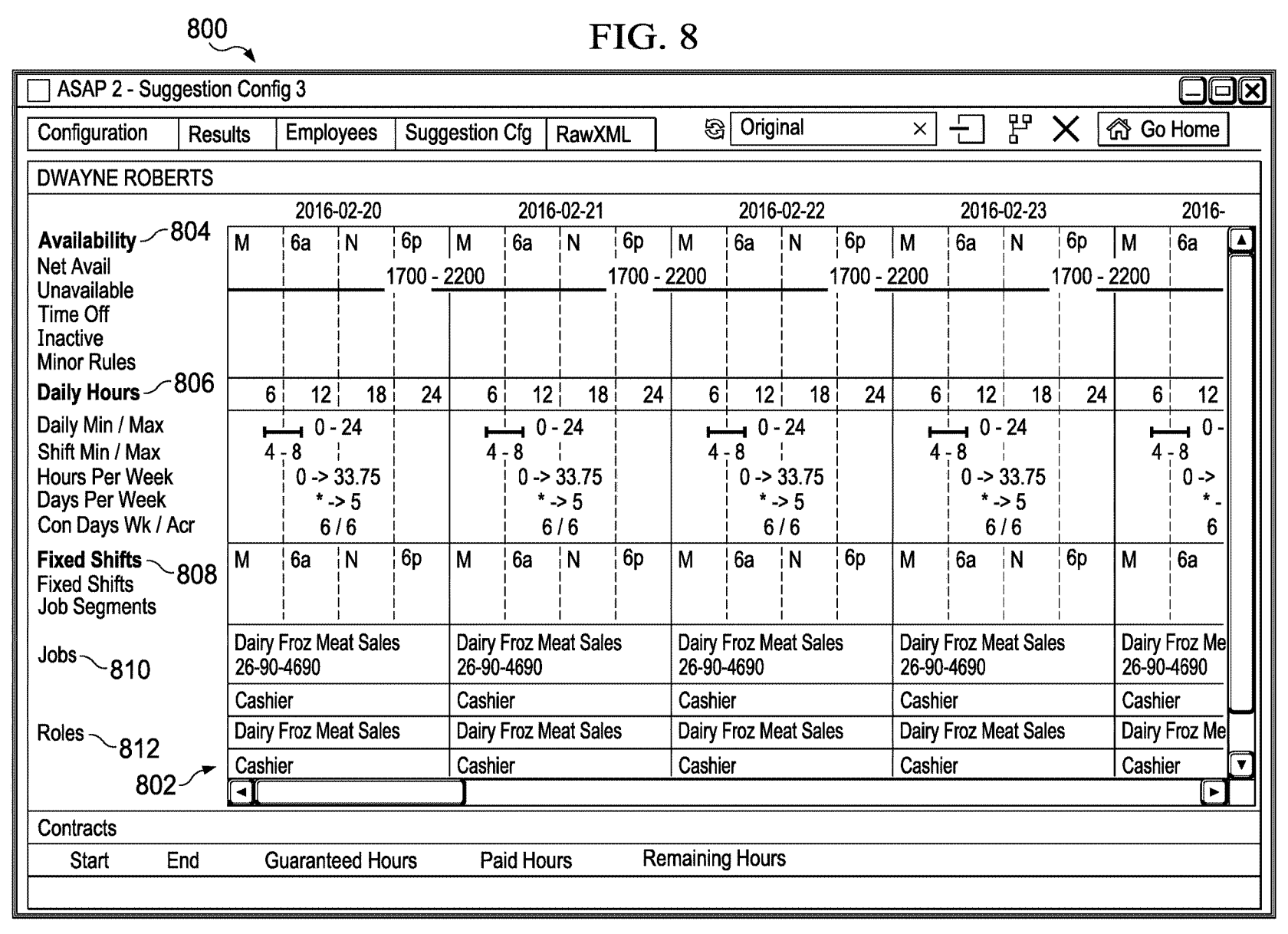

FIG. 8 illustrates individual employee interface 800 of staff planner 110, according to an embodiment. Individual employee interface 800 comprises employee schedule viewer 802, which includes employee availability 804, daily hours 806, fixed shifts 808, jobs 810, and roles 812. According to embodiments, employee schedule viewer 802 displays one column per day for a planning range, net availability, the constraints that combined to create the net availability, daily hours as a histogram, weekly hours and days, fixed shift definitions, close employee detail, and job assignments.

Embodiments contemplate additional interfaces for configuring and displaying elements of the long-range staff plan, including a filter screen, suggestions configurations, raw xml viewing, and the like. According to embodiments, a filter screen interface comprises an employee filter to, for example, filter by the employee able to work a role, filter by the employee able to work an assigned shift strategy, filter by the employee being able to work the job or having as their primary job, choose only employees who are available, have a fixed shift, or have a contract. If a day is set, then the criteria must be met on that calendar day. If a day is not set, then the criteria may be met at any time in the data range.

Additionally, a suggestions configuration interface screen provides for setting parameters and shift strategies when creating suggestions. For example, for each job a set of shift strategies are chosen for the engine to use when creating suggestion, such as, for example, a spread shift strategy and a most used shift strategy. A spread shift strategy may comprise representing a variety of minimum weekly hours evenly spread across the range of strategies. A most used shift strategy may comprise selecting by how many employees who have that job also have that shift strategy. Additionally, suggestions configuration interface screen provides for setting a maximum number of shift strategies to use for suggestions of long-range staff planning engine 200. Additionally, suggestions configuration interface screen displays shift strategies associated with each job, the method used to select the shift strategies, a list of selected shift strategies, which may be displayed in order of priority, a number of employees who have the particular strategy and jobs combination displayed, and a popup box that displays if a strategy represents other duplicate strategies.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A system of determining long-range staff planning, comprising:
   a database comprising data representing one or more employees and one or more sites;
   a computer coupled with the database and comprising one or more processors and one or more memory units to execute instructions to:
   determine a baseline measurement of labor demand over a time period of the one or more employees at the one or more sites;
   modify the baseline measurement of the labor demand over the time period based on one or more constraints that allow the one or more employees to work additional roles at the one or more sites and including one or more simulated employees that represent potentially hired employees;
   determine working times and job assignments for the one or more employees and the one or more simulated employees based on the modified baseline measurement of the labor demand;
   identify one or more cross-training suggestions for the one or more sites by selecting at least one cross-training suggestions of the one or more cross-training suggestions that minimize penalties associated with the working times and the job assignments for the one or more employees and the one or more simulated employees; and
   store the determined working times and job assignments in the database for the one or more employees at the one or more sites; and
   one or more mobile communication devices, wherein at least one of the one or more mobile communication devices is associated with an employee of the one or more employees identified in the at least one cross-training suggestion, and the at least one of the one or more mobile communication devices associated with the employee of the one or more employees identified in the at least one cross-training suggestion receives a query comprising a request to retrain for the role identified in the at least one cross-training suggestion.

2. The system of claim 1, wherein the computer further executes instructions to:
   identify one or more hiring suggestions for the one or more sites by selecting at least one hiring suggestion of the one or more hiring suggestions that minimize penalties associated with the working times and the job assignments for the one or more employees and the one or more simulated employees.

3. The system of claim 2, wherein the at least one cross-training suggestion comprises a role that requires additional coverage in the long-range staff plan and one or more employees who are assigned a job which indicates that the one or more employees may be cross-trained in the role that requires additional coverage.

4. The system of claim 3 wherein the at least one hiring suggestion comprises a job based on the one or more simulated employees, a starting availability, a minimally required schedule, and a shift strategy.

5. The system of claim 4, wherein the computer further executes instructions to:
   display, on a display associated with the computer, the at least one hiring suggestion and the at least one cross-training suggestion in an order of priority, wherein the highest priority is associated with a lowest calculated penalty.

6. The system of claim 5, wherein the computer automatically updates the long-range staff plan based, at least in part, on receiving confirmation from the at least one or more mobile communication devices that the employee will retrain for the role indicated in the query.

7. A computer-implemented method of determining a long-range staff plan, comprising:
   determining, by a computer coupled with a database, the computer comprising one or more processors and one or more memory units, and the database comprising data representing one or more employees and one or more sites, a baseline measurement of labor demand over a time period of the one or more employees at the one or more sites;
   modifying, by the computer, the baseline measurement of the labor demand over the time period based on one or more constraints that allow the one or more employees to work additional roles at the one or more sites and including one or more simulated employees that represent potentially hired employees;
   determining, by the computer, working times and job assignments for the one or more employees and the one or more simulated employees based on the modified baseline measurement of the labor demand;
   identifying, by the computer, one or more cross-training suggestions for the one or more sites by selecting at least one cross-training suggestions of the one or more cross-training suggestions that minimize penalties associated with the working times and the job assignments for the one or more employees and the one or more simulated employees;

storing, by the computer, the determined working times and job assignments in the database for the one or more employees at the one or more sites;

receiving, by one or more mobile communication devices, wherein at least one of the one or more mobile communication devices is associated with an employee of the one or more employees identified in the at least one cross-training suggestion, and the at least one of the one or more mobile communication devices associated with the employee of the one or more employees identified in the at least one cross-training suggestion, a query comprising a request to retrain for the role identified in the at least one cross-training suggestion.

8. The method of claim 7, further comprising:
identifying, by the computer, one or more hiring suggestions for the one or more sites by selecting at least one hiring suggestion of the one or more hiring suggestions that minimize the calculated penalties associated with the working times and the job assignments for the one or more employees and the one or more simulated employees.

9. The method of claim 8, wherein the at least one cross-training suggestion comprises a role that requires additional coverage in the long-range staff plan and one or more employees who are assigned a job which indicates that the one or more employees may be cross-trained in the role that requires additional coverage.

10. The method of claim 9, wherein the at least one hiring suggestion comprises a job based on the one or more simulated employees, a starting availability, a minimally required schedule, and a shift strategy.

11. The method of claim 10, further comprising:
displaying, on a display associated with the computer, the at least one hiring suggestion and the at least one cross-training suggestion in an order of priority, wherein the highest priority is associated with a lowest calculated penalty.

12. The method of claim 11, further comprising:
automatically updating, by the computer, the long-range staff plan based, at least in part, on receiving confirmation from the at least one or more mobile communication devices that the employee will retrain for the role indicated in the query.

13. A non-transitory computer-readable medium comprising software, the software when executed configured to:
determine a baseline measurement of labor demand over a time period of one or more employees at one or more sites;
modify the baseline measurement of the labor demand over the time period based on one or more constraints that allow the one or more employees to work additional roles at the one or more sites and including one or more simulated employees that represent potentially hired employees;
determine working times and job assignments for the one or more employees and the one or more simulated employees based on the modified baseline measurement of the labor demand;
identify one or more cross-training suggestions for the one or more sites by selecting at least one cross-training suggestions of the one or more cross-training suggestions that minimize penalties associated with the working times and the job assignments for the one or more employees and the one or more simulated employees;
store the determined working times and job assignments in a database for the one or more employees at the one or more sites; and
receive, by one or more mobile communication devices, wherein at least one of the one or more mobile communication devices is associated with an employee of the one or more employees identified in the at least one cross-training suggestion, and the at least one of the one or more mobile communication devices associated with the employee of the one or more employees identified in the at least one cross-training suggestion, a query comprising a request to retrain for the role identified in the at least one cross-training suggestion.

14. The non-transitory computer-readable medium of claim 13, wherein the software is further configured to:
identify one or more hiring suggestions for the one or more sites by selecting at least one hiring suggestion of the one or more hiring suggestions that minimize penalties associated with the working times and the job assignments for the one or more employees and the one or more simulated employees.

15. The non-transitory computer-readable medium of claim 14, wherein the at least one cross-training suggestion comprises a role that requires additional coverage in the long-range staff plan and one or more employees who are assigned a job which indicates that the one or more employees may be cross-trained in the role that requires additional coverage.

16. The non-transitory computer-readable medium of claim 15, wherein the at least one hiring suggestion comprises a job based on the one or more simulated employees, a starting availability, a minimally required schedule, and a shift strategy.

17. The non-transitory computer-readable medium of claim 16, wherein the software is further configured to:
display, on a display associated with the computer, the at least one hiring suggestion and the at least one cross-training suggestion in an order of priority, wherein the highest priority is associated with a lowest calculated penalty.

* * * * *